Feb. 23, 1932.  A. BUCHMÜLLER  1,846,787

CENTERING GAUGE

Filed Sept. 19, 1930

Inventor
Alfred Buchmüller
By Henry Ortt
Atty.

Patented Feb. 23, 1932

1,846,787

UNITED STATES PATENT OFFICE

ALFRED BUCHMÜLLER, OF CONZ, NEAR TRIER, GERMANY, ASSIGNOR OF FORTY PER CENT TO PETER ZETTELMEYER, OF CONZ, GERMANY, TWENTY PER CENT TO MRS. M. WEBER, OF TRIER, GERMANY, TWENTY PER CENT TO MRS. DR. E. BICHLER, OF TRIER, GERMANY, AND TWENTY PER CENT TO MRS. DR. H. CORSTEN, OF BERLIN-LICHTERFELDE, GERMANY

CENTERING GAUGE

Application filed September 19, 1930, Serial No. 483,144, and in Germany August 9, 1928.

The present invention relates to a marking gauge adapted to be used in the workshop to determine the center of objects.

Hitherto the determination of the centre of a hole has been effected by inserting in the hole a three-legged gauge and screwing the three screws thereof outwards until the three legged gauge seized in the hole. With the aid of a pair of compasses, one limb of which is constructed as a feeler, the centre was determined on the leaden core inserted in the three-legged gauge, marked and centre punched or pricked. In the case of small holes a suitably shaped piece of flat iron is usually driven into the hole until it makes a tight fit and the centre marked in the same way and centre punched.

This method of finding centres is, however, very inaccurate, for in marking and centre punching the centre found, more or less deviation from the true position occurs according to the nature of the constructional material used. The centre punch and the surface to be marked never lie exactly in the same plane. Further complications arise when one or more points pitched at a given angle from the centre have to be determined in this way. It has, therefore, already been proposed to determine the centres of holes and the like by means of an instrument having three simultaneously adjustable stops and an adjustable centre punch mark. The amount of eccentricity present could not, however, be measured with the known instruments.

The gauge according to the present invention is provided with stops which are adjustable independently of each other in radial slots and a centre hole or indentation which is placed in the same plane of the surface on which the gauge bears. The periphery of the disc-shaped instrument is also graduated, so that not only the centre of a hole but also an eccentric point can be determined at any desired angle.

Another advantage of the gauge according to the present invention is that it can also be used on cylindrical pieces of work or parts thereof. The stops, which are attached to the underside of the instrument, have for this purpose flats on their inner sides so as to fit the cylindrical parts, their outer sides being wedge-shaped for insertion into holes.

A constructional form of the invention is shown by way of example in the accompanying drawings, in which:—

Figure 1:
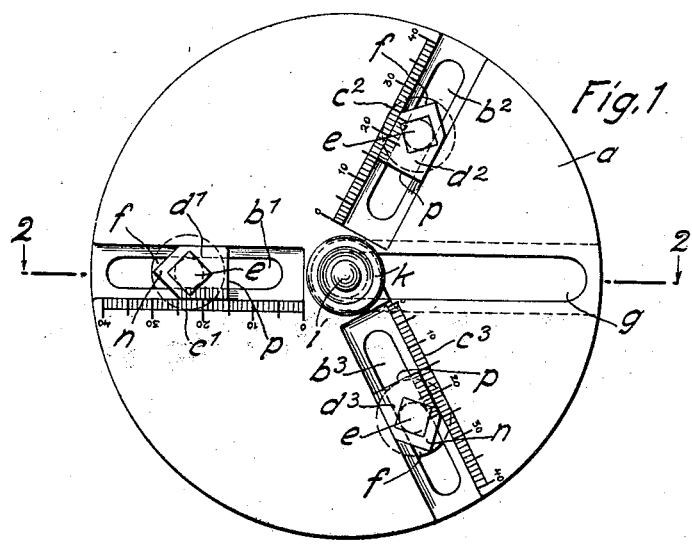
Fig. 1 is a plan view from the underside of the instrument.

The circular disc $a$ contains at equiangular distances apart three radial slots $b^1$, $b^2$ and $b^3$ which start close to the centre of the disc and extend almost to its edge. These slots are provided along their sides on the under part of the disc (see Fig. 1) with scales $c^1$, $c^2$ and $c^3$ reading, for example, from 0 to 40 millimeters. In these slots $b^1$, $b^2$ and $b^3$ slide the downwardly extending stops $d^1$, $d^2$ and $d^3$, which are adapted to be locked in position by clamping the screws $e$ passing through the slots $b^1$, $b^2$ and $b^3$ and milled nuts $f$ on the top of the disc. As is known, at least three stops are necessary to be able to center the gauge in a round opening. The stops $d^1$, $d^2$ and $d^3$ are provided with suitable vernier scales which in conjunction with the scales $c^1$, $c^2$, $c^3$ permit of fine adjustment up to say a tenth of a millimeter.

Figure 3:
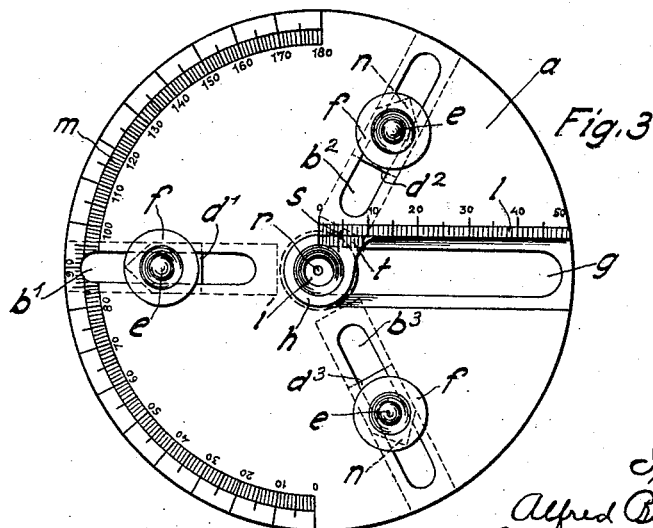
Fig. 3 is a top plan view of the instrument.

Between the two radial slots $b^2$ and $b^3$ is a longer slot $g$, which extends to the centre of the disc and acts as a guide to an upper slide $h$. One side of the slot $g$ is provided on the top of the disc (see Fig. 3) with a scale $l$ reading from, say 0 to 50 millimetres. The slide $h$ can be locked in any position by means of a screw $i$ and a milled nut $k$ underneath. The slide $h$ is in the form of a short pointer and carries along its tangential edge $s$ a scale $t$, which acting in conjunction with the scale $l$, after the fashion of a vernier, enables the slide to be accurately adjusted to one tenth of a millimetre. The slide $h$ is provided with a centre hole or indentation $r$, which indicates the particular point sought inside or outside the axis of rotation of the piece of work. Half the periphery of the disc $a$ is provided with a scale $m$ reading from 0° to 180°.

Figure 2:
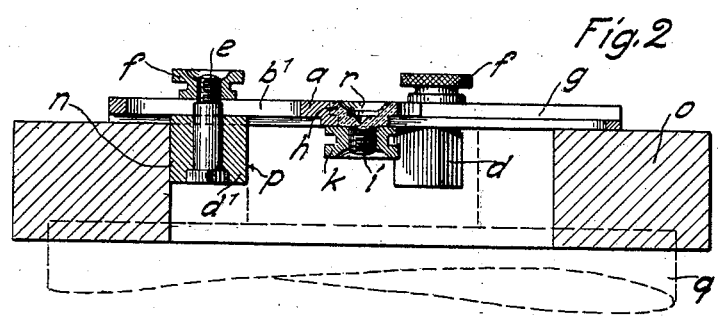
Fig. 2 is a vertical section on the line 2—2 of Fig. 1, the instrument being shown resting on a hollow cylinder.

The adjustable stops $d^1$, $d^2$ and $d^3$ carry on their outsides wedge-shaped parts $n$ adapted to make linear contact with the inner walls of the tubular piece of work $o$. On their insides the stops have flat sides $p$, which when the instrument is fitted on to a cylinder $q$ (indicated by dot and dash lines in Fig. 2) lie at a tangent to the external surface of such cylinder.

The instrument is used in the following way:

To ascertain the centre of a hole the three stop members $d^1$, $d^2$ and $d^3$ on the lower side of the disc are adjusted by means of the scales $c^1$, $c^2$, $c^3$ and $l$ engraved thereon and are then locked in position by tightening up the milled nuts $f$: the centre of the hole is then found on the upper side of the disc in the middle of the slide $h$ thereon.

If the slide $h$ be now used, which can be moved sideways towards the scale $l$ provided by loosening the central lower milled nut $k$, any eccentricity lying within range can be ascertained.

The slide $h$ when in position at the inner extremity of the slot $g$ is located in the exact centre with respect to the three edges $n$, and a circle may be described on the piece $o$ which is concentric to the hole in which the gauge rests, whereas if the slide $h$ is moved outwardly a given distance, a circle described on the piece $o$ with the point $r$ as the centre will have a definite eccentricity with the said hole.

To enable points to be determined by a fixed angle the graduation angle $m$ on the left hand upper side is used in conjunction with the centre of the slide $h$ determined by the centre hole $r$.

For example in a gear box it is possible that the individual shafts may be not only parallel to each other but one may lie above the other or at an angle to the other. If two shafts are located at an angle to a third shaft, the graduated scale $m$ is used to fix the angle of the centre point of one shaft with respect to the other by laying a straight edge from the point $r$ to the centre point of one shaft and another straight edge from point $r$ to the centre point of the other shaft and measuring the included angle.

When the instrument is used with a cylindrical projection or the stump end of a shaft, such as $q$ the flat sides $p$ of the three stop members $d^1$, $d^2$ and $d^3$ act as bearing points.

I claim:

1. In a gauge for marking out centers, a disc provided with at least three radial slots, an independently adjustable stop radially movable in each slot, a slide having a center hole and means for mounting said slide radially adjustable on said disc.

2. A gauge for marking out centers comprising in combination a disc-shaped member having at least three radially and equi-angularly disposed guideways formed therein, stops movable along said guideways, said disc-shaped member also having an additional guideway formed therein extending radially from the center of said member, and a slide having a center hole, mounted on said additional guideway and adapted to move therein.

3. In a centering gauge, a disc body containing at least three radial slots, an independently adjustable stop radially movable in each slot, and a radially adjustable slide, having a center hole, means for mounting said slide on said disc and means for severally locking said slide and stops in any desired position.

4. A centering gauge comprising in combination a disc-shaped member having at least three radially and equi-angularly disposed guideways formed therein, stops movable along said guideways, said disc-shaped member having an additional guideway formed therein and extending radially from the center of said member, and a slide movable in said additional guideway and having a center hole therein and means for severally locking said slide and stops in position.

5. In a centering gauge, a disc provided with at least three radial slots, an independently adjustable stop radially movable in each slot, a radially adjustable slide, having a center hole, means for mounting said slide on said disc said slide and said disc having cooperating parts of a vernier scale formed thereon.

6. In a centering gauge, the combination of a disc-shaped member provided with at least three radially disposed slots, independently adjustable stops radially movable in said slots, a radially adjustable slide having a center hole means for mounting said slide on said disc and said slide and said disc having cooperating parts of a vernier scale formed thereon, and means for severally locking said slide and stops in position.

7. A gauge for marking out centers comprising in combination a disc-shaped member having at least three radial and equi-angularly disposed guideways therein, stops movable along said guideways, said disc-shaped member also having an additional guideway formed therein extending radially from the center of the said member, and a slide movable along said additional guideway and having a center hole therein, said disc-shaped member having scales formed thereon adjacent said slide and stops and means for severally locking said slide and stops in position.

8. A gauge for marking out centers, comprising a disc-shaped member having at least three radially and equi-angularly disposed guideways formed therein, depending stops movable within said guideways, said disc-shaped member having an additional guideway formed therein and extending radially from the center of said member, and a slide having a center hole movable in said additional guideway.

9. A gauge for marking out centers comprising a disc-shaped member having at least three radially and equi-angularly disposed guideways formed therein, depending stops movable within said guideways, said disc-shaped member having an additional guideway formed therein and extending radially from the center of said member, and a slide having a center hole movable in said additional guideway, and means for severally locking said slide and said stops in position.

10. A gauge for marking out centers comprising in combination a disc-shaped member having at least three radially and equi-angularly disposed guideways formed therein, stops movable along said guideways, said disc-shaped member also having an additional guideway formed therein extending radially from the center of said member, and a slide movable along said additional guideway, said slide having a center hole, said disc-shaped member having scales formed thereon adjacent said guideways, said slide being provided with a tangential edge having a scale formed thereon, the said scale adjacent the additional guideway cooperating with the said scale on the tangential edge.

11. A gauge for marking out centers as defined by claim 10 having means for locking said stops and slide in position.

12. A gauge for marking out centers comprising a disc-shaped member having a scale formed on the periphery thereof and having at least three radially and equi-angularly disposed guideways formed therein, said member having scales formed thereon adjacent said guideways and stops movable within said guideways, said disc-shaped member also having an additional guideway formed therein extending radially from the center of said member and a slide movable along said additional guideway, said slide having a center hole, said slide being provided with a tangential edge having a scale formed thereon, said scale adjacent the additional guideway cooperating with the said scale on the tangential edge, and means for locking said stops and slide in position.

In testimony that I claim the foregoing as my invention, I have signed my name.

ALFRED BUCHMÜLLER.